Aug. 15, 1933.  V. G. APPLE  1,922,518
VEHICLE BRAKE
Original Filed Nov. 2, 1929   2 Sheets-Sheet 1

INVENTOR.
Vincent G. Apple
BY
Burton & McConkey
ATTORNEYS

Aug. 15, 1933.   V. G. APPLE   1,922,518
VEHICLE BRAKE
Original Filed Nov. 2, 1929   2 Sheets-Sheet 2

INVENTOR.
Vincent G. Apple
BY
Burton & McConkey
ATTORNEYS

Patented Aug. 15, 1933

1,922,518

UNITED STATES PATENT OFFICE 1,922,518

VEHICLE BRAKE

Vincent G. Apple, Dayton, Ohio, assignor to Bendix Brake Company, South Bend, Ind., a Corporation of Illinois Application November 2, 1929, Serial No. 404,242
Renewed August 7, 1930

6 Claims. (Cl. 188—156)

My invention relates to brakes and has particular reference to automotive vehicle brakes wherein some form of power device controlled by the vehicle operator is utilized to apply a larger braking force than is manually possible.

An object of my invention is to incorporate with a completely enclosed brake assembly wherein a power device such as a solenoid is used as a brake actuating mechanism, and which structure is similar to the mechanism in my copending application Serial Number 404,-240, filed Nov. 2, 1929, a simplified and efficient means for actuating the brake shoes manually from a point outside the drum enclosure, independently of the power means.

Another object of my invention is to so design and assemble this independently operable manual actuating means in conjunction with the power means that it is readily adaptable for use on a full floating, a three quarter floating, or a semi-floating rear axle.

Figure 1:
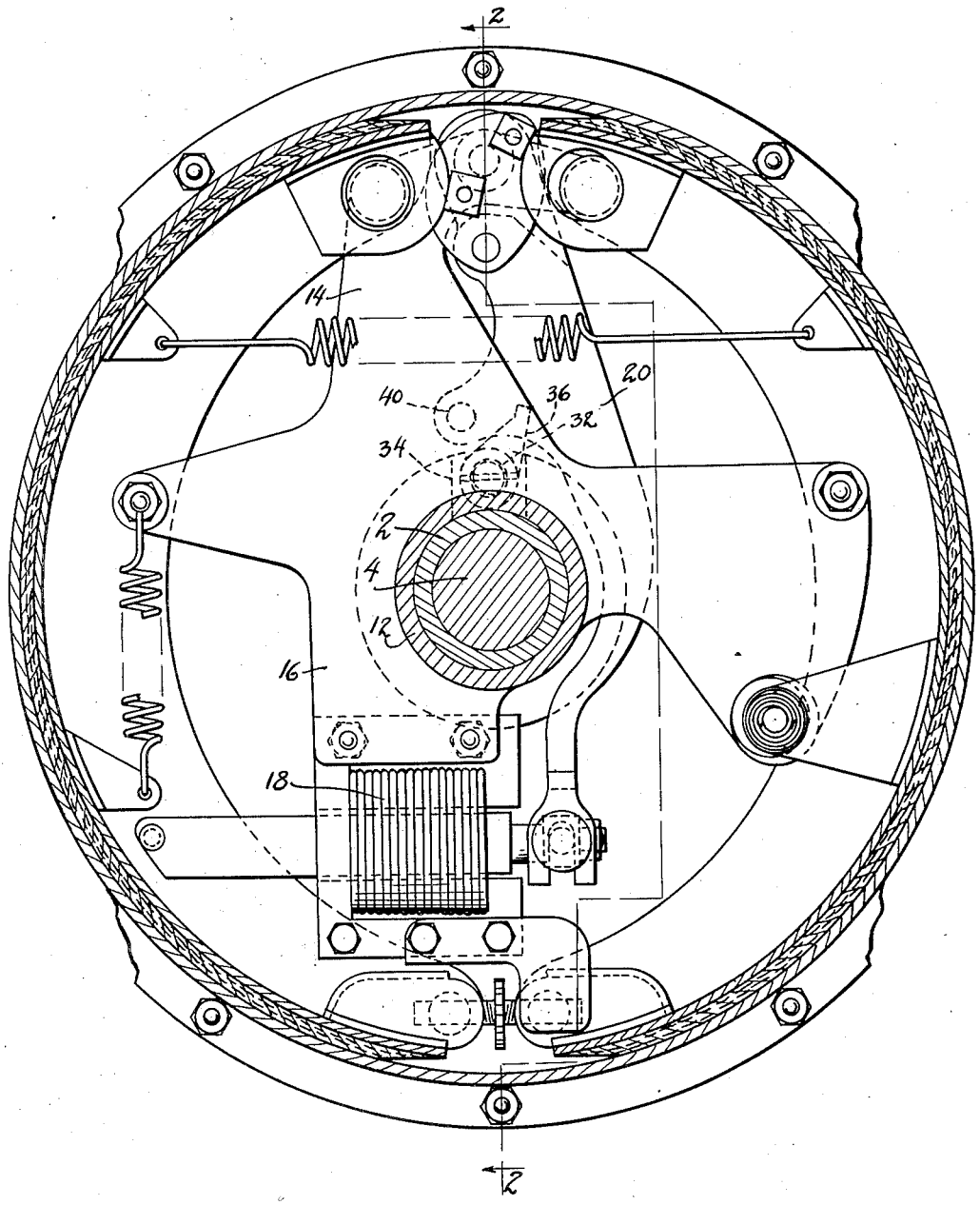
Figure 2:
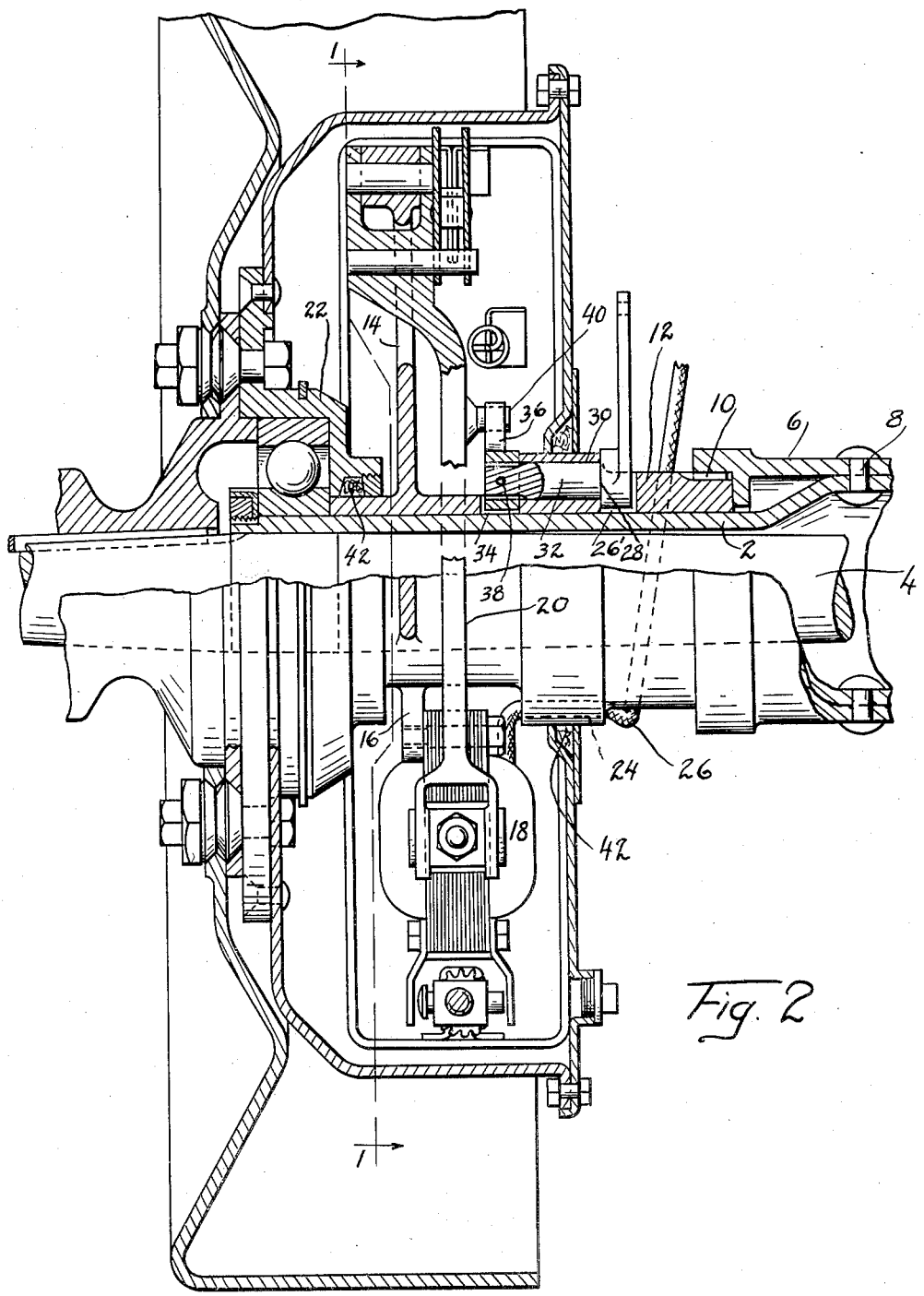

Further objects and meritorious features of my invention will be apparent from the following description in conjunction with the accompanying drawings, wherein like numerals refer to like parts throughout the several figures and wherein Fig. 1 is a transverse section on the line 1—1 of Fig. 2, and Fig. 2 is a vertical axial section on line 2—2 of Fig. 1.

In the drawings the numeral 2 represents the tubular spindle which houses the rear axle 4. It is provided with a reinforcing member 6 which is riveted thereto at 8. Splined to the member 6 at 10 is the hub 12 of the brake torque plate which carries the radially extending arms 14 and 16, on which are mounted the radially expansible brake shoes and the solenoid 18 which expands the brake shoes by actuating the brake arm 20, all as set forth in detail in my copending applications above identified but omitted from the present disclosure since it forms no essential part of the present invention. The wheel and closed drum assembly is rotatably journalled about the spindle 2 by the bearing housing 22, completely enclosing the brake shoe and solenoid mechanism and thereby preventing the ingress of dust and dirt which rapidly destroys the efficiency of the mechanism.

The hub 12 of the brake torque plate is drilled as at 24 and the conductor cable 26 is led therethrough to the solenoid from a point outside the drum enclosure.

The hub 12 is also provided with a U-shaped opening 26' through which the combined lever and shaft 28 is inserted in the hole 30, thus forming a bearing for the shaft portion 32 of the combination lever and shaft. Another opening 34 is provided for the cam lever 36, which is splined on the shaft portion 32 of the member 28. A pin 38 retains the cam lever 36 in its proper position.

On the brake operating arm 20 there is a stud 40 with which the cam lever 36 is adapted to contact when the shaft 32 is rotated in its bearing and in this way the brake shoes may be manually actuated independently of the solenoid by some mechanical linkage hooked up with the lever and shaft member 28.

Although the closed drum structure has not been illustrated herein, I have clearly indicated the inner and outer bearing surfaces thereof by the packing ring 42, which is secured to the brake drum cover plate, and the bearing housing 22.

Various modifications of the structure herein illustrated and described may be apparent to those skilled in the art, and for that reason I intend to limit myself only within the scope of the appended claims.

I claim:

1. In combination with power brake mechanism, means for actuating the brakes independently of the power means consisting of a torque plate hub having a bearing therein, a shaft journalled therein having an arm at each end, one of said arms being disconnectedly coupled with said brake operating mechanism.

2. In combination with a solenoid operated brake mechanism, a non-rotatable torque plate hub supporting said mechanism; a bearing in said hub, a shaft rotatably journalled therein, said shaft having an operating lever at one end and a cam lever secured to the other end disconnectedly engaging the brake operating mechanism.

3. Brake mechanism comprising a non-rotatable axle, a hub secured thereto, expansible friction means and a solenoid for expanding the same supported by the hub, a lever operatively connecting the solenoid and friction means, and a shaft rotatably journalled in the hub and having disconnected engagement with said lever for actuating the same independently of the solenoid.

4. Brake mechanism comprising a non-rotatable axle, a closed drum rotatably journalled thereabout, a hub secured to the axle, brake shoes and solenoid operating means therefor supported within the drum by the hub; an operating arm connecting the shoes and solenoid, a bearing in said hub extending axially thereof, and a shaft rotatably journalled therein disconnectedly coupled with said operating arm and rotatable from a point outside the drum.

5. Brake mechanism comprising a non-rotatable axle, a hub secured thereto, expansible friction means and power means for expanding them supported by said hub, a closed drum rotatably journalled on the axle enclosing said friction and power means, a bearing recess formed in said hub extending lengthwise thereof, and means rotatably journalled in the bearing whereby said friction means may be manually expanded from a point outside the drum.

6. Brake mechanism comprising in combination a non-rotatable axle, a drum closed at both ends rotatably journalled thereon, a hub secured against rotation on said axle extending within the drum, brake shoes and power means for actuating them supported by the hub within the drum, a bearing in the hub, and means rotatably journalled in said bearing and extending to a point outside the drum whereby said brake shoes may be manually actuated independently of the power means.

VINCENT G. APPLE.